United States Patent [19]

Benton

[11] Patent Number: 4,616,679

[45] Date of Patent: Oct. 14, 1986

[54] PIPE THREAD PROTECTOR

[76] Inventor: Jerry A. Benton, 26 Amarillo Dr., Houma, La. 70360

[21] Appl. No.: 739,685

[22] Filed: May 31, 1985

[51] Int. Cl.$^4$ .................. F16L 57/00; B65D 59/00
[52] U.S. Cl. .................. 138/96 T; 138/96 R
[58] Field of Search .................. 138/96 R, 96 T, 109; 308/4 R, 4 A

[56] References Cited

U.S. PATENT DOCUMENTS

| | | | |
|---|---|---|---|
| 1,854,339 | 4/1932 | Lamb | 308/4 A |
| 3,038,502 | 6/1962 | Hauk et al. | 138/96 T |
| 3,709,261 | 1/1973 | Jones | 138/96 T |
| 3,858,613 | 1/1975 | Musslewhite | 138/96 T |
| 4,212,486 | 7/1980 | Logsdon | 138/96 R X |
| 4,349,048 | 9/1982 | Clark | 138/96 R X |
| 4,398,566 | 8/1983 | Janzen | 138/96 T |
| 4,415,005 | 11/1983 | Janzen | 138/96 T |

Primary Examiner—James E. Bryant, III
Attorney, Agent, or Firm—Nies, Webner, Kurz & Bergert

[57] ABSTRACT

A pipe thread protector which provides a friction grip on the exterior of a threaded pipe section is disclosed. The protector includes an outer tapered shell with a pad of compressible material positioned in a recess in the interior side wall of the shell. A compression shaft in combination with a handle and cam device provides for compression of the pad so as to lock the protector to the pipe section. The particular configuration of the pipe thread protector of the present invention maintains the inside diameter of the pipe free from any obstruction throughout the length thereof, thus allowing the pipe to be drifted without obstruction. A quick release mechanism allows the protector to be easily removed when the pipe section is ready for installation on the job site.

6 Claims, 9 Drawing Figures

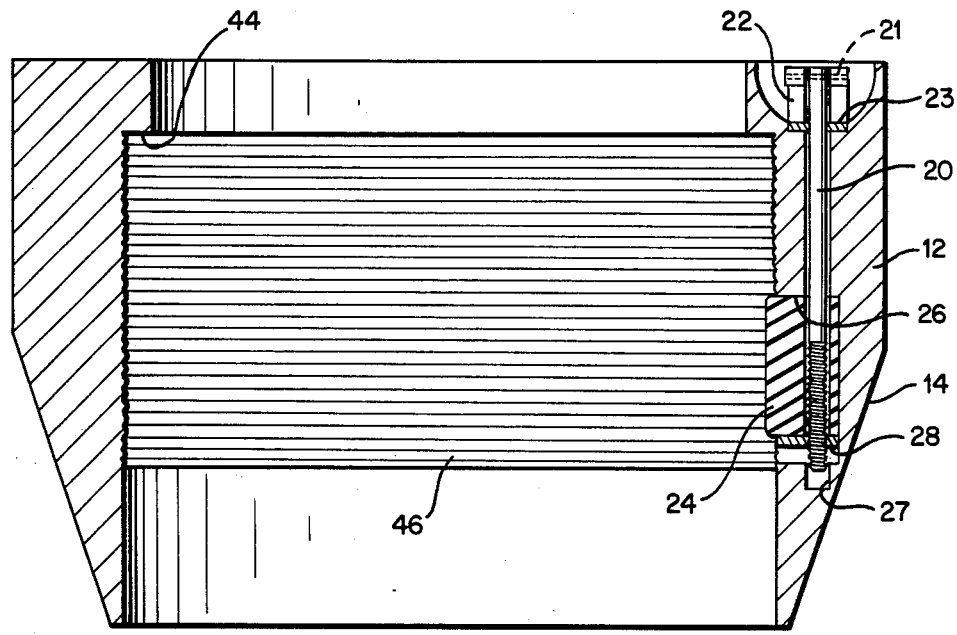
FIG. 2
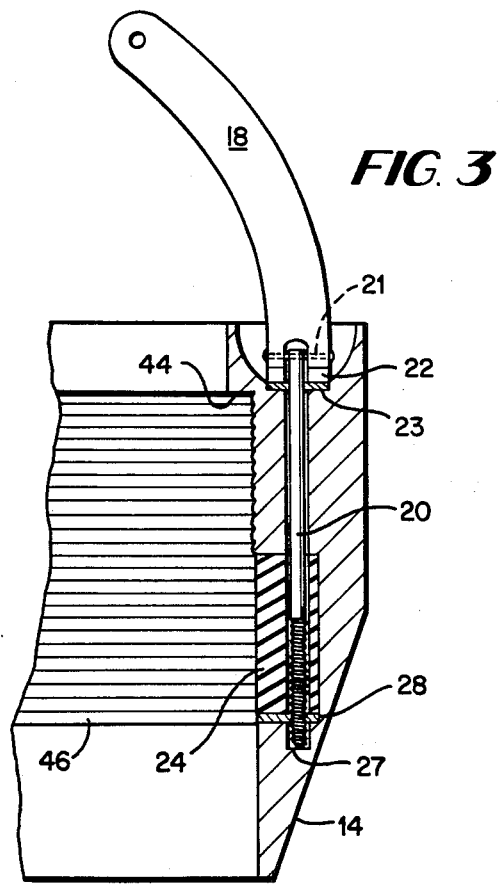
FIG. 3
FIG. 5

PIPE THREAD PROTECTOR

BACKGROUND AND SUMMARY OF THE INVENTION

The present invention relates to a pipe thread protector and more particularly to a protector for the threaded ends of tubular products such as a well casing or tubing joint used in oil wells and the like.

In the field of oil well technology, tubular materials usually come from the factory with a screw-on thread protector. Once on the job site where the pipe is to be used, these screw-on protectors are removed while the pipe is on the pipe storage rack. When the pipe is raised or dragged to the drilling rig floor, a quick removal type protector is needed to protect the pipe threads. Using the quick removal protector saves time which in turn saves money.

Previous pipe thread protectors are described in the following U.S. Pat. Nos.: 2,543,960 to Elmer; 2,824,579 to Groh et al.; 3,038,502 to Hauk et al.; and 4,349,048 to Clark.

By the present invention there is provided an improved pipe thread protector which fully meets the needs of the industry. The protector device of the present invention includes a tapered outer shell of one piece construction which fits circumferentially around and provides a friction grip on the exterior of the threaded end of the pipe. A pad of compressible material such as rubber or similar material is positioned between the outer shell and the threaded exterior surface of the pipe. The compressible material is caused to expand radially inwardly within the shell to engage the pipe in the locked position.

A handle is attached by pivot means to the outer shell, and the handle is connected to a bolt extending through the compressible material in a direction parallel to the longitudinal axis of the pipe. The inner end of the handle is provided with a cam mechanism which acts to compress the compressible polyurethane material in an axial direction, causing the material to expand radially inwardly as the handle is pressed downwardly into the locked, friction grip position with the outer shell located circumferentially around the exterior of the pipe end. In this locked position of the protector, the inside diameter of the pipe is clear throughout the length thereof, thus allowing the pipe to be drifted without obstruction.

In use, the pipe thread protector of the present invention is disposed on an externally threaded end of a pipe casing or tubing joint while the pipe section is moved along the pipe rack and platform and adjacent inclined surface areas. Such movement of the pipe could result in damage to the threads if the thread protector were not in position. When the thread protector is removed from the casing or tubing joint and disposed in suspended relation above the joint, the protector may be placed on an inclined guy wire, in accordance with conventional practice, for gravitational return to the pipe rack for subsequent use on other joints. The number of thread protectors should preferably be adequate to enable personnel to appropriately install the thread protector on the casing or tubing joint before it is moved from the pipe rack. By proceeding in this manner, there will always be a supply of pipe thread protectors available for use so that installation and removal can be quickly and safely performed.

BRIEF DESCRIPTION OF THE DRAWINGS

FIG. 2 is a side elevation in cross section taken along line 2—2 of FIG. 1 with the handle in the closed position.

FIG. 3 is a partial side elevation in cross section of the pipe thread protector of FIG. 1 with the handle in the open position.

FIG. 5 is a partial elevation in cross section taken along line 5—5 of FIG. 4.

DESCRIPTION OF THE PREFERRED EMBODIMENTS

Figure 1:
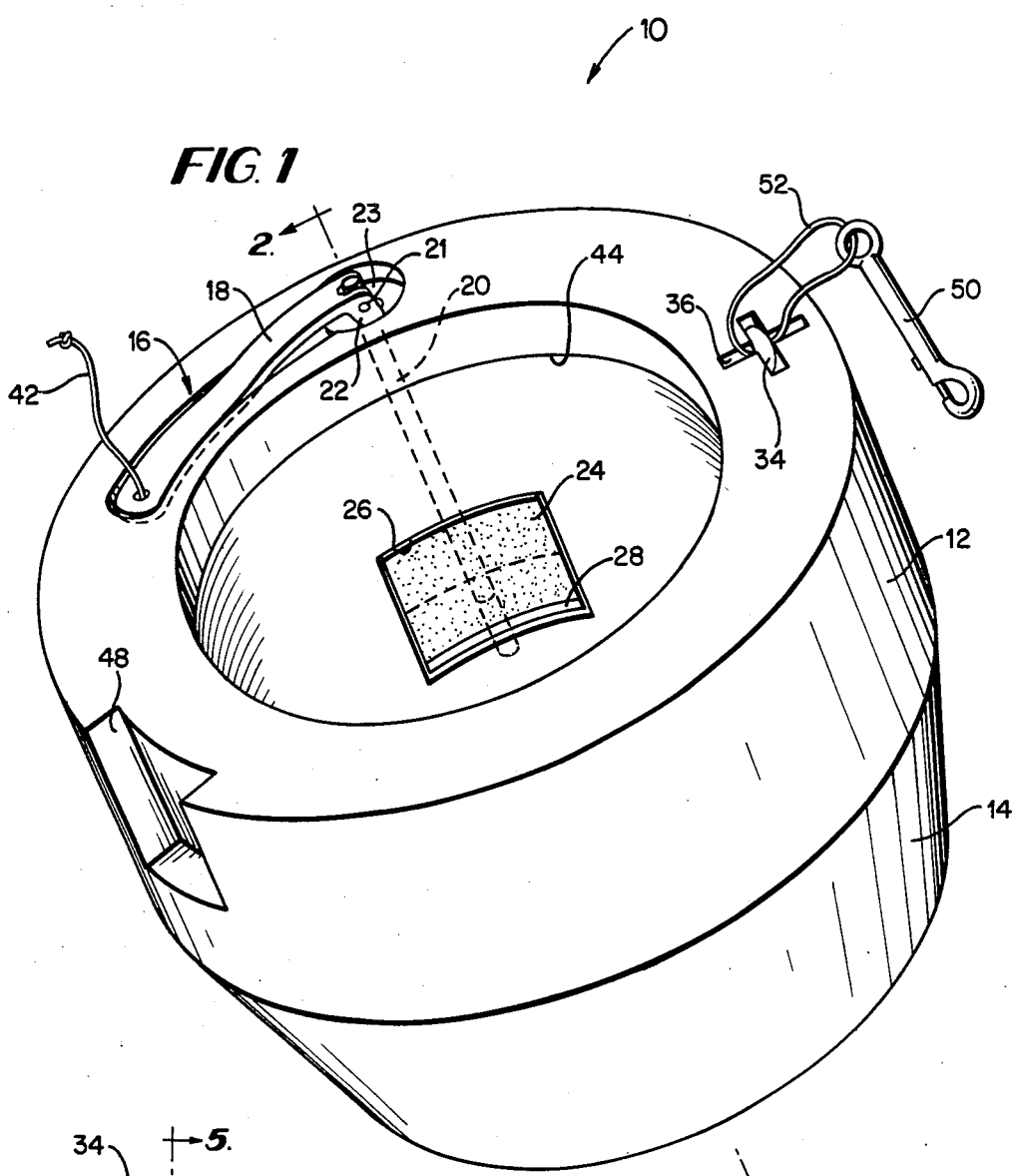
FIG. 1 is a perspective view of the pipe thread protector of the present invention.

In the embodiment of the invention as shown in FIGS. 1 through 9, there is provided a pipe thread protector 10 in the form of a cylindrical outer shell member 12 having a tapered forward end 14, with the taper being in the direction in which the pipe section will generally be moved. The shell 12 may be formed of polyurethane or other material that will not damage the pipe threads. A cavity or recess 16 is provided in the rear end surface of the shell 12 for the purpose of receiving a handle in the form of a lever 18 connected to a threaded compression shaft 20 by means of a pivot pin 21. A cam portion 22 is formed in the inner heel end of the lever 18 and the cam 22 rests on an annular ring 23 positioned in the recess 16, with the shaft 20 passing through the ring 23.

At approximately the midpoint of the length of the shell member 12 there is provided a compressible pad 24 which fits into an opening 26 in the inner side wall of the shell 12. As shown in FIG. 2, the threaded compression shaft 20 passes through the compressible material 24 and is threadedly received in a compression plate 28 which is secured to the lower end of the compressible material 24. A recess 27 in the lower end of opening 26 allows the shaft 20 to move downwardly as necessary.

Located at a position approximately 90 degrees from the lever 18 and compression shaft 20 is an eyebolt transport device 30 in the form of a shaft 32 which is embedded in the side wall of the shell 12 so as to extend parallel to the longitudinal axis of the shell 12 and with an upper eye portion 34 which is located in a cavity or recess 36 in the rear end wall of the shell 12. An opening 38 in the inner sidewall of the shell 12 provides access to allow the shaft 32 to be secured to the shell 12 by suitable nut and washer means 40. A releasable attachment device 50 is secured to the eyebolt 30 by means of a loop 52. The eyebolt device 30 allows the protector 10 to be releasably attached to a guy wire for return to the pipe racks.

Figure 6:
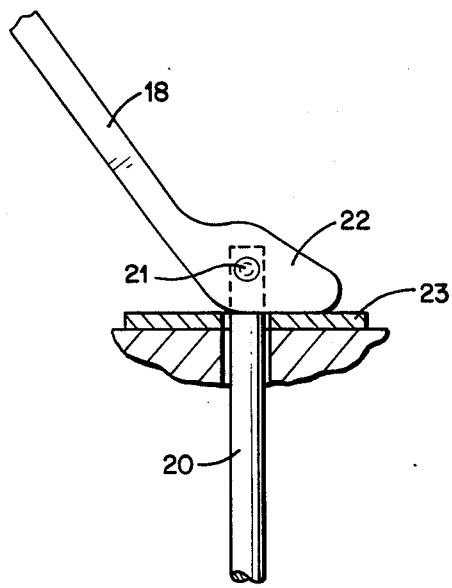
FIGS. 6 through 9 show schematic drawings of the cam action of the handle employed in the pipe thread protector of FIG. 1.
Figure 7:
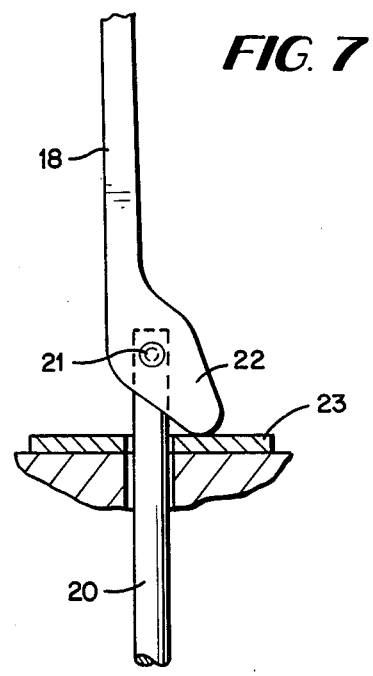
Figure 8:
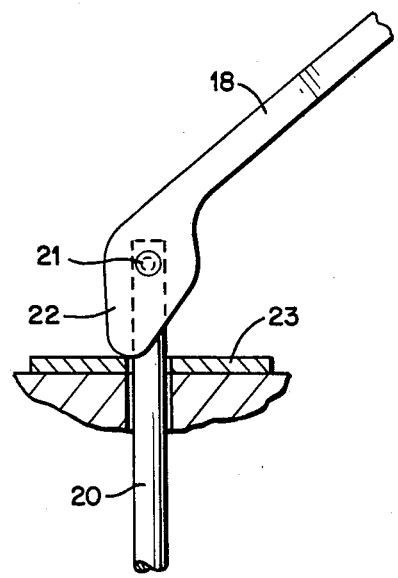
Figure 9:
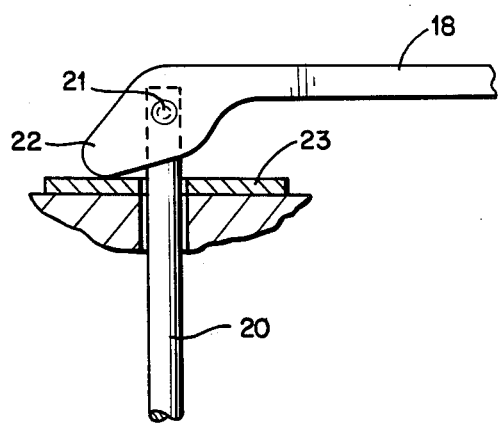

In FIGS. 6 through 9, there is shown a schematic representation of a sequence of steps in which the handle 18 with cam portion 22 is rotated from the open to the closed or locked position. As shown in FIG. 6, the cam 22 provides minimal pressure on the ring 23 when the handle 18 is in the unlocked position. As the handle 18 is moved into the upright position of FIG. 7 and further to the 45 degree position of FIG. 8, the configuration of the cam 22 is such that increasing pressure is brought to bear on the ring 23, thus forcing the shaft 20 upwardly which in turn causes plate 28 to bear against and compress the pad member 24, forcing the pad 24 inwardly against a pipe section located within the protector 10. At approximately the 45 degree position of the handle 18, relative to the horizontal, the configuration of the cam is such that maximum upward pressure is exerted on the shaft 20. Beyond that point, as the handle 18 moves to the horizontal closed position shown in FIG. 9, the upward pressure on the shaft 20 is somewhat reduced, allowing the handle 18 to snap into the closed or locked horizontal position. A length of rope 42 or similar material is secured to the handle 18 at its outer end to assist in moving the handle between the various positions.

Figure 4:
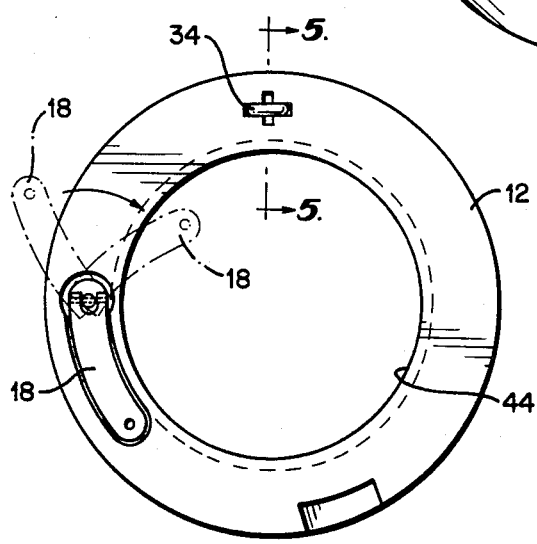
FIG. 4 is a rear end view of the pipe thread protector of FIG. 1 showing the handle in various alternative positions.

When the handle 18 is in the open position so that the cam 22 is not exerting pressure on the compression shaft 20, the handle 18 may be rotated, as shown in FIG. 4, to vary the relationship between the shaft 20 and compression plate 28, thus varying the compression forces on the pad 24 during the locking cycle.

As shown in FIGS. 1-5, an inner lip 44 is provided in the rear end of the shell 12 to maintain the pipe in proper position relative to the protector 10. The interior surface of the shell 12 is provided with a plurality of grooves 46 at intervals such as about ¼ inch along the inner length of the shell 12, to assist in gripping the pipe. An indentation or notch 48 is provided in the rear end surface of the shell 12 to facilitate use of a pick-up hook in engaging the protector 10.

As can be seen from a comparison of FIGS. 2 and 3, when the handle 18 is operated so as to move the compression shaft 20 upwardly, the compression plate 28 is also caused to move upwardly thus compressing the compressible material 24 longitudinally and causing the material 24 to extend radially inwardly into the interior of the shell 12 so as to press against and engage a pipe section located interiorly of the shell 12. Upon unlocking the handle 18 by moving the handle 18 in a downward direction, from the position of FIG. 7 to that shown in FIG. 6, the compression plate 28 also moves downwardly, thus releasing the compressible pad 24 which in turn releases the grip of the pad 24 on the pipe section.

In the unlocked condition, the handle 18 can be rotated 360 degrees for the purpose of adjusting the relation of the threaded compression shaft 20 to the compression plate 28, thus allowing adjustment of the extent of compression of the compressible material 24.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A device for protecting the threads of a threaded pipe section comprising: a cylindrical member having interior and exterior side walls and with end walls at opposite ends of said side walls, said interior side wall having a recessed portion therein, said cylindrical member defining an opening for receiving a section of pipe; and means for forming a friction grip between said cylindrical member and the outer wall of a pipe section received by said cylindrical member, said friction grip means providing for said pipe section to be open across the entire diameter of said pipe section throughout the length thereof and to allow the pipe section to be drifted without obstruction, said friction grip means including a compressible member mounted in said recessed portion of said interior side wall, said compressible member, when compressed by a force applied in a direction generally parallel to the longitudinal axis of said cylindrical member, expanding laterally to extend radially inwardly of said interior side wall, a compression plate secured to said compressible member, said compression plate being disposed in a plane generally perpendicular to the longitudinal axis of said cylindrical member, a compression shaft mounted within said cylindrical member between the interior and exterior side walls and extending in a direction generally parallel to the longitudinal axis of said cylindrical member, said compression shaft having one end thereof threadedly received in said compression plate and the other end extending to the exterior of said cylindrical member, and a handle pivotally mounted to the exterior end of said compression shaft, said handle having cam means for moving said compression shaft in a direction generally parallel to the longitudinal axis of said cylindrical member to increase or reduce the degree of compression of said compressible member.

2. The device of claim 1, further including means for adjusting the relation of the threaded compression shaft to the compression plate, thus allowing adjustment of the extent of compression of said compressible member.

3. The device of claim 2 wherein said handle is pivotally mounted to the compression shaft so as to be freely rotatable 360 degrees in an unlocked position in which said cam means does not apply pressure to move said compression shaft, thus allowing adjustment of the extent of compression of said compressible member.

4. The device of claim 1 wherein said interior side wall has a grooved configuration.

5. The device of claim 1, further including an eyebolt member mounted on one end wall of said cylindrical member for use in transporting said device.

6. The device of claim 1 wherein said cylindrical member has a forward tapered end portion.

* * * * *